US009420105B2

(12) United States Patent
Le Gouez et al.

(10) Patent No.: US 9,420,105 B2
(45) Date of Patent: *Aug. 16, 2016

(54) LOCATION-BASED CALL INITIATION

(71) Applicant: Genesys Telecommunications Laboratories, Inc., Daly City, CA (US)

(72) Inventors: Laurent Le Gouez, Brest (FR); Stéphane Blécon, Bohars (FR)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/173,775

(22) Filed: Feb. 5, 2014

(65) Prior Publication Data

US 2014/0153712 A1  Jun. 5, 2014

Related U.S. Application Data

(63) Continuation of application No. 13/686,785, filed on Nov. 27, 2012, now Pat. No. 8,681,966.

(51) Int. Cl.
*H04M 3/42* (2006.01)
*H04M 3/523* (2006.01)
*H04W 4/02* (2009.01)

(52) U.S. Cl.
CPC .............. *H04M 3/5231* (2013.01); *H04W 4/02* (2013.01); *H04M 2242/14* (2013.01); *H04M 2242/30* (2013.01)

(58) Field of Classification Search
CPC . H04M 1/575; H04M 7/006; H04M 3/42348; H04M 2242/30; H04M 3/48; H04M 3/523
USPC ............. 379/142.1, 201.01, 207.12, 210.01, 379/265.01, 266.01
See application file for complete search history.

(56) References Cited

U.S. PATENT DOCUMENTS

| 6,002,760 | A | 12/1999 | Gisby | |
|---|---|---|---|---|
| 2001/0028703 | A1* | 10/2001 | Katseff et al. | 379/88.18 |
| 2006/0256949 | A1* | 11/2006 | Noble, Jr. | 379/265.01 |
| 2010/0042611 | A1* | 2/2010 | Cruzada | 707/5 |
| 2010/0070368 | A1* | 3/2010 | Choi et al. | 705/14.58 |
| 2011/0231493 | A1* | 9/2011 | Dyor | 709/206 |
| 2011/0307547 | A1 | 12/2011 | Backer et al. | |
| 2012/0323997 | A1 | 12/2012 | Mezhibovsky et al. | |

* cited by examiner

*Primary Examiner* — Oleg Asanbayev
(74) *Attorney, Agent, or Firm* — Lewis Roca Rothgerber Christie LLP

(57) ABSTRACT

An apparatus has a processor and a memory, the memory storing instructions that when executed by the processor, cause the processor to schedule a communication between a contact center and a communication device associated with a user, prompt the user to configure a geographic location for the communication device, track geographic location for the communication device, and initiate the communication in response to determining that the geographic location of the communication device appliance is the configured geographic location.

17 Claims, 5 Drawing Sheets

LOCATION-BASED CALL INITIATION

CROSS-REFERENCE TO RELATED APPLICATIONS

This application is a continuation of U.S. patent application Ser. No. 13/686,785 filed on Nov. 27, 2012, the entire content of which is incorporated herein by reference.

FIELD

The disclosure generally relates to the technical area of contact centers and pertains more particularly to managing callback to customers based at least in part on location of the customer's communication appliance.

BACKGROUND

The art of contact centers is well known, and call management, including callback management is generally part of contact center operations. Generally, a customer provides particular time and channel preferences for callback, but improvements are always desirable. As customer satisfaction is one of the main concerns in contact center operations, it is desirable to provide additional benefits in call initiation and management.

SUMMARY

In some implementations an apparatus is provided comprising a processor and a memory, the memory storing instructions that when executed by the processor, may cause the processor to schedule a communication between a contact center and a user's specific communication device, enable the user to configure a geographic location for the specific communication device, track geographic location for the specific communication device, and initiate the communication upon the geographic location of the communication device appliance being determined by the contact center to be the configured geographic location. In some implementations the instructions may further cause the processor to enable the user to further configure one or more of date, time, and communication channel for the scheduled communication in addition to geographic location for the specific communication device.

In some implementations of the apparatus the instructions may further cause the processor to present an interactive window enabling the user to indicate a point or region on a map to be used as the geographic location to trigger the communication, and the point or region indicated by the user in the interactive window may be converted into longitude and latitude coordinates and stored as the geographic location to trigger the communication. In some implementations the instructions may further cause the processor to utilize a third party service to determine the coordinates.

In some implementations of the apparatus the instructions may further cause the processor to maintain a database relating locations by address and description to coordinates, enable the user to describe a location, parse the location described by the user for keywords and phrases, and present to the user candidate locations matching the description. In still other implementations the instructions may further cause the processor to track location of the specific communication device by Global Positioning System (GPS).

In some implementations the instructions may further cause the processor to cooperate with a third-party service to track location of the specific communication device. The third-party service may be a cellular service provider. In some implementations the instructions may further cause the processor to impose a time delay before initiating the communication upon the geographic location of the communication device appliance being determined to be the configured geographic location.

In another aspect a method is provided, comprising the acts scheduling by a computing device having a processor, a communication from a contact center to a user's specific communication device, presenting to the user an interactive window by the computing device, enabling the user to configure a geographic location associated uniquely with the specific communication device, periodically tracking by the computing device the geographic location for the communication device, and upon the geographic location of the communication device being determined to be the configured geographic location, initiating the communication.

In some implementations further acts enable the user to configure one or more of date, time, and communication channel in addition to geographic location to initiate the scheduled communication. In some other implementations an act may present to the user an interactive window enabling the user to indicate a point or region on a map to be used by the communication system as the geographic location to be used for triggering the communication. In yet another implementation an act may convert the point or region indicated by the user in the interactive window into longitude and latitude coordinates and storing the coordinates as the geographic location. The coordinates may be provided to the contact center by a third-party service.

In some implementations acts may be provided maintaining a database relating locations by address and description to coordinates, presenting to user a first interactive window for describing a location, parsing the user's description for keywords and phrases, and presenting candidate locations in a second window. Tracking location of the computerized appliance may be by Global Positioning System (GPS), which may be accomplished by a third-party system, and the coordinates may be provided to the computing device.

In some implementations of the method acts may be provided tracking the location of the computerized appliance by a wireless enterprise, and providing coordinates from the tracking to the contact center. A time delay may be imposed prior to the communication being initiated.

DETAILED DESCRIPTION

Figure 1:
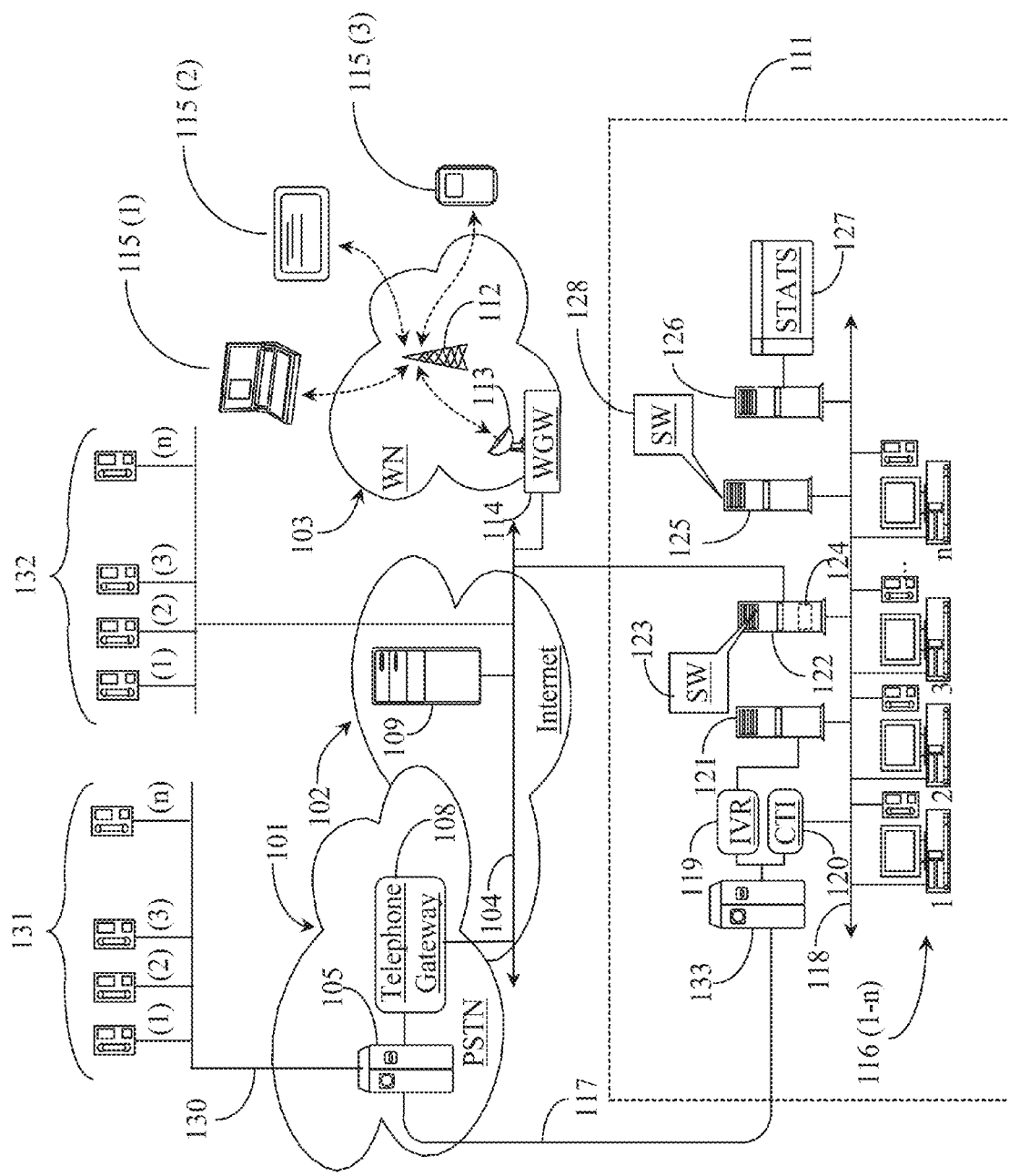
FIG. 1 is an architectural diagram depicting a contact center and network connections in an implementation of the present invention.

FIG. 1 is an exemplary architectural diagram of a network-connected system that includes a contact center 111 in an implementation of the present invention. It is to be noted that this architecture is merely exemplary, and there are many alterations that might be made, in which the architecture would still be suitable for implementations of this invention. It is also to be noted that there may be several more contact centers sharing outbound and inbound traffic and distributing answered outbound calls to agents.

This exemplary system comprises a wide-area-network (WAN) 102, a public-switched telephone network (PSTN) 101, and a wireless carrier network (WN) 103. PSTN 101 may be any publicly switched telephone network or combination thereof. WAN 102 may be a corporate or public WAN, and may be the well-known Internet network. Wireless network 103 may be any wireless carrier network and is typically a cellular telephony network.

WAN 102 is the Internet network in one implementation because of its high public access characteristic, and is referred to herein as Internet 102. Internet 102 is further exemplified by a network backbone 104 representing all of the lines, equipment, and connection points that make up the Internet as a whole. Therefore, there are no geographic limitations to practice of the present invention.

Network backbone 104 in this example supports a web server 109, which may be hosted by any one of a wide variety of enterprises or organizations, and represents all web servers that may be instantiated in the Internet.

Contact center 111 is illustrated in this example as built upon a local area network (LAN) 118 supporting various equipment and facilities for practicing contact-center interaction processing. LAN 118 supports a plurality of work stations 116 (1-n) useful for contact center agents, the workstations dedicated to services for the host of the contact center. Each contact center agent in this example operates from one of agent stations 116 (1-n). Each agent station 116 (1-n) includes a LAN-connected computing appliance and a switch-connected telephone for illustrative purposes only, as the specific equipment types and operation may vary. The telephone capability at agent stations may be provided through the LAN as digital telephony, as shown in this example, or some telephones may be connected by Destination Number lines (not shown) to a landline switch 133, which in turn is connected to landline network 101 by trunk 117.

Landline network 101 includes a network-level telephone switch 105, representing a plurality of such switches in the network. Switch 105 may be an automated call distributor (ACD) or a private branch exchange (PBX), or some other type of telephony switching facility without departing from the spirit and scope of the present invention. Telephone switch 105 is connected to central office telephone switch 133 in contact center 111 via telephony trunk 117. Switch 133 represents the last hop for landline callers before being routed to agent stations 116 (1-n). Gateway 108 is adapted by software executing from a physical medium to facilitate cross conversion of telephony traffic from the landline network to the Internet network and from the Internet over the landline network.

Landline telephones 131 (1-n) connect to landline switch 105 via lines 130. Calls from agents may be made to landline telephones via this connectivity and calls from the landline telephones, may be connected to agents as well.

Digitally-enabled telephones 132 (1-n) connect to Internet backbone 104, and calls may be made to such telephone devices from agents at contact center 111, and incoming calls or answered calls in an outbound campaign may be routed to agents in contact center 111.

Consumer mobile appliances 115 (1), 115 (2) and 115 (3) are wirelessly enabled to connect to network backbone 104 via a cell tower 112, a transceiver 113, and a wireless multimedia gateway (WGW) 114 bridging communications between wireless network 103 and Internet 102. Consumer appliance 115 (1) may be a Laptop computer, 115 (2) may be a tablet appliance, and 115 (3) may be a cellular telephone, such as an iPhone or an Android-enabled telephone. Users operating appliances 115 (1-3) may initiate and manage telephone calls, multi-media transactions, emails, and web-browsing sessions.

Referring again to contact center 111 in FIG. 1, there are a number of servers providing a variety functions, such as a Computer Telephony Integration (CTI) server 120, an Interactive Voice Response (IVR) server 119 and a server 121 providing voice applications in support of IVR interactions with callers. It may be noted that the particular deployment in the architecture of such servers may vary widely in different use cases.

A server 122 with a processor 124 executing software (SW) 123 is connected to Internet backbone 104, and is enabled to manage Internet Protocol voice and multimedia communication, either initiated by agents to appliances outside the contact center, or incoming from such appliances, to be distributed to agents in the contact center. A statistics server 126 having a connected data storage 127 performs statistical services for various operations in the contact center, storing information such as agent profiles, customer profiles and the like, and performing a variety of functions in support of the contact center.

A server 125 executing SW 128 in this example is dedicated to overall contact center management, one function of which is customer callback operations. Contact centers are typically dedicated to the purposes of a commercial enterprise, such as a bank or an airline, to provide services to customers of the enterprise. One function of contact centers is to serve the interests of customers, which may be done at least in part by dialogue between customers and agents at agent stations 116 (1-n). For example, for a contact center operated on behalf of an airline, customers may use contact center services to make and change flight reservations, pay for tickets, inquire about flight status, change flights and flight times, inquire about baggage restrictions, reserve and pay for premium seating and much more. Customers may interact and transact with the airline's services through the airline's web site, or by email, chat, instant messaging, or voice telephony, either landline or Internet protocol, with agents at the contact center, or in combinations of such channels.

In the course of an agent or other facility of a contact center transacting business with a customer it is frequently the case that the customer's interest is not completely satisfied in a single communication session. For example, a customer using a landline telephone 131 (FIG. 1) may call contact center 111 to make reservation for round-trip travel for two people from one airport to another. That customer may call at a time when all agents are busy and be put on hold for the next available agent. The contact center management SW 128 has a queuing system for the purpose, and calls are distributed to agents based on any number of intelligent routing schemes. In some cases the wait time may be prohibitive, and the contact center system may inform the customer that she may remain in queue for the next available agent, or the contact center will call the customer back when an agent becomes available, or at some time convenient for the customer.

The description above is but one of many reasons that a callback may be desired in an interaction between a contact center and a customer. There are many other reasons. For example a customer may not have been able to make a seat selection on one of the flights, and the contact center may offer to call the customer back when seat selection on that flight is available. As another example a customer may wish to be notified when and if one of the flights is known to be delayed.

Customers may have many preferences for callback. One customer, for example, may want to be sure he is never called at his dinner-time, from 7:00 to 8:00 PM Pacific. Another may want all such calls to come at a certain fifteen-minute window on Monday through Friday, and never on weekends. The same or another customer may prefer that all such callbacks come as voice calls to his smart phone, and never to his home land-line phone, even though he may originate calls to a contact center from his land-line telephone.

Although customers do generally have the option to provide callback preferences, such as, for example, preferences for days, times, and channels for callback, it is desirable to utilize other parameters with respect to callbacks. According to one exemplary embodiment, a callback may be triggered by location. In implementations of the present invention a customer might for example, want an update of her flight itinerary precisely fifteen minutes after she first arrives at the preferred customer (VIP) lounge of the particular airline in the terminal where the first flight is scheduled to depart. The customer may have a fairly good idea when she might arrive at the VIP lounge, but due to many variable circumstances, that arrival time may vary by as much as an hour or more. If the call from the contact center to the customer can be triggered by her arrival at the VIP lounge, and then delayed by fifteen minutes, she will have time to settle in with a glass of sherry after her arrival at the VIP lounge, and then, through the triggered callback, review the status of her itinerary and her first fight. Further, she may configure that the location-triggered callback be a voice call by a VIP agent, who may have access to recently developing information which may be advantageous for the customer.

In any case, a contact center in one implementation of the present invention may have a software-supported mechanism for customer preference. This may be a very simple and straightforward system in which an agent, in dialogue with the customer, perhaps following a script, may offer a callback to the customer for any one of many purposes at or near the end of a voice conversation. In this example, the agent may manually set a date, time and channel for such a notification. The callback need not be limited to a voice call, but may include other types of communication. For example, a callback may be an email, an instant message, or even an alert by some channel for the customer to call in. The callback might also be made by more than one channel, such as by voice call and email, for example.

In some implementations the particular contact center may have a software-supported mechanism for the customer, who may be a regular and known customer of the enterprise, to configure callback options. A customer might have many preferences for a callback, such as a time window when that customer prefers to take a call from this particular contact center, or a particular telephone number or contact address. A customer may make reservations for a business flight from home, and may prefer that a callback be made during business hours at the customer's place of business.

Figure 2:
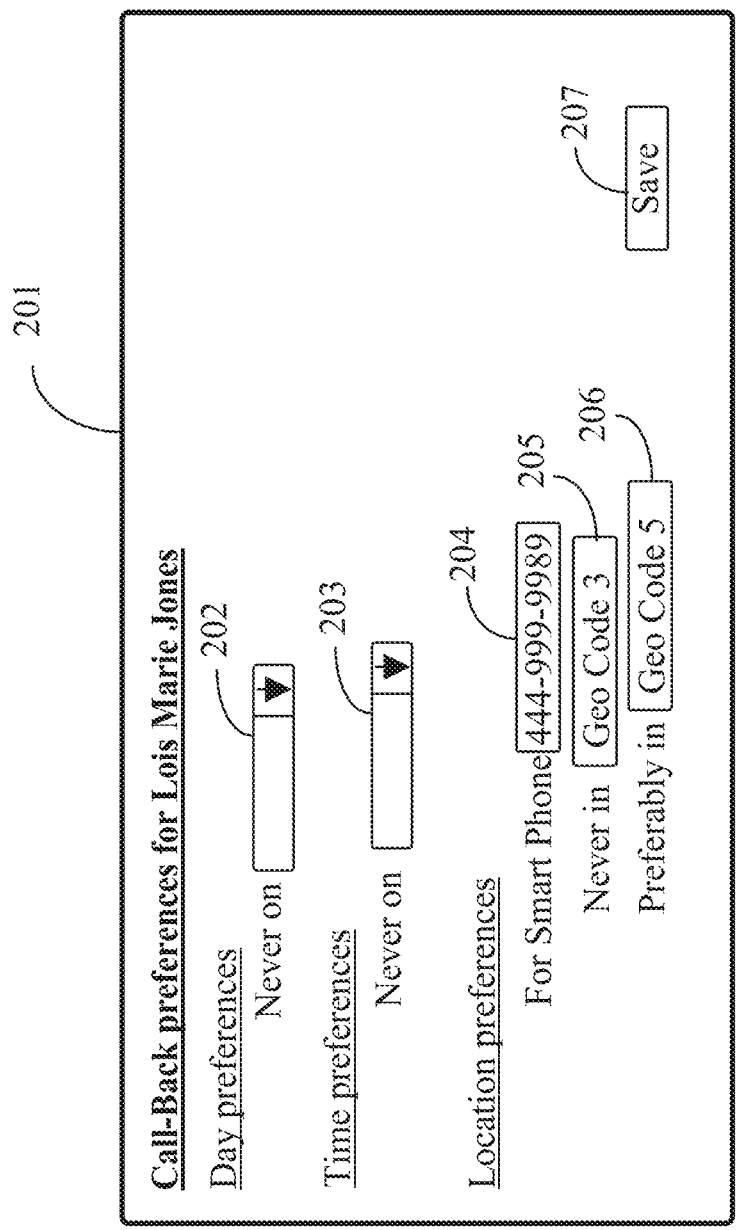
FIG. 2 illustrates an example of an interactive window offered to a customer in an implementation of the present invention to configure callback parameters.

In one implementation the contact center offers customers through a web page a configuration option for callback. FIG. 2 is an example of an interactive window 201 offered to a customer in an implementation of the present invention. The customer in this example is a VIP customer named Lois Marie Jones (a fictitious name). In this example interactive window she is offered day preferences by a drop-down window 202 and time preferences by another drop-down window 203. Unique location preferences are offered to Lois Jones associated with specific devices, like a smart phone for example, associated with the telephone number of the smart phone, which Lois Jones may enter in interactive window 204. Then, for that device, Lois may, in one example, configure geographic areas where she perhaps never wants a callback, and other areas where callback is acceptable, and others where callback may be intimately associated with a specific expected call.

According to exemplary embodiments, when a callback is scheduled, the contact center periodically obtains the geographic location of Lois Jones' communication device, in this case the smart phone with the number 444-999-9989. One way to accomplish this may be through satellite Global Positioning System (GPS), in which location is pinpointed by longitude and latitude on the Earth's surface to a fraction of a degree. Any other mechanism conventional in the art may be used in addition or in lieu to GPS, to pinpoint a user's location.

Lois Jones and other customers of a contact center may not be expected to enter latitude and longitude for specific geo-locations that the customer may want to associate with callback preferences. Therefore in one implementation of the invention the contact center provides a location configuration service leveraging Google Maps™, or a system similar to Google Maps™. In some implementations this service is in cooperation with Google™, and in some implementations may be a proprietary system or a third party system providing services to the contact center.

Figure 3:
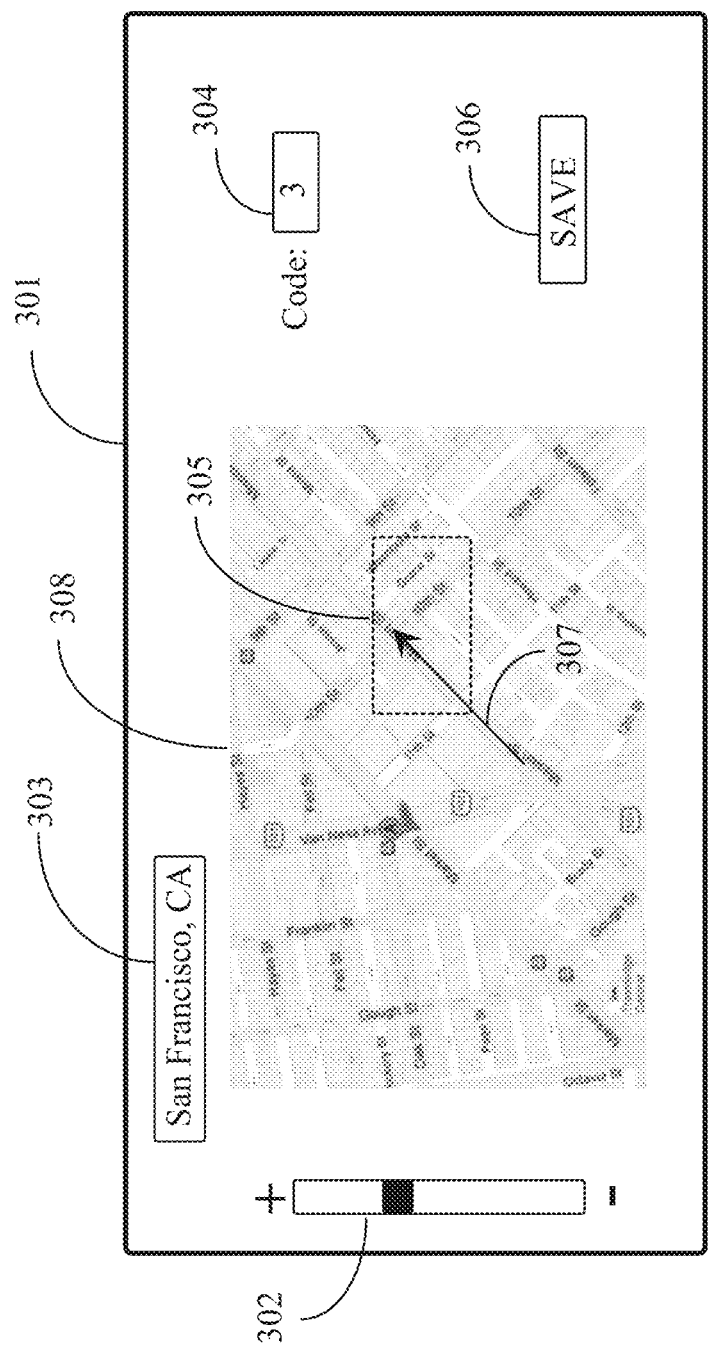
FIG. 3 is an example of an interactive window that may be offered to the customer to configure geo-location parameters.

FIG. 3 is an example of an interactive window that may be offered to the customer to configure geo-location parameters. The user may enter a city or region in field 303 and a map 308 may be displayed of that city or region at some level of magnification. The user may zoom in or out with scroll bar 302. When the region the user wishes to configure as a specific location for callback is sufficiently legible in map 308, the user may drag a box 305 to specify the exact region or location. The user may identify the new specific region by an ID or code number or code word in field 304 and save the result by button 306. The user may specify and identify any number of such coded regions or locations, and use these in configuration window 201, or in specific dialogue with an IVR or an agent in different implementations of the present invention.

According to one implementation, the user may provide text description of particular locations that the user wishes to use in configuring callback options, associate code ID with these descriptions, and the system may be enabled to find and specify suitable coordinates from the descriptions. In some implementations the user may specify by a click, rather than dragging a box, and the system is enabled to specify a standardized region surrounding the point. In some implementations there may be time parameters involved as well, which is described in more detail below.

Returning to FIG. 3, in some implementations the user may be enabled to set parameters for call initiation based on movement, rather than strictly by location or near location. A user might, for example, wish to initiate a transaction according to movement along a particular street or pathway in a particular direction, with reference to one or more points along the street or pathway.

In one such implementation the user may draw a line 307 following a street, in this example Mission Street in San Francisco, with the arrow of the line terminating at the intersection with 10th Street, The direction parameter in this example is determined by the direction in which the user draws the line with the cursor. The beginning of the line, in this case just off Highway 101 may indicate to the system that there is a parameter to consider for this user. Continuing movement of the user along the path may cause the system to access the particular parameter, and continue to monitor movement of the user toward the endpoint. As the user approaches or reaches the endpoint, the prescheduled transaction may be triggered.

In some implementations paths, including starting points and end points, movement along the path, and also speed of movement (velocity) may be included as necessary or conditional parameters for triggering a transaction. For example, such parameters may be leveraged to initiate a transaction when the particular user turns into an entrance to a specific parking garage, or enters an on-ramp to a freeway. In the freeway case, this user may wish to utilize driving time on the freeway to catch up on calls, and the same sort of parameter may be used to terminate transactions; that is, the user entering an off-ramp from the same freeway, may serve to terminate transaction with the user.

Given both static and dynamic parameters, plus time conditions, and the fact that parameters may be used to initiate or terminate transactions, a rich mix of conditions may be specified by users to initiate and terminate transactions. It may be necessary to provide continuous or nearly continuous monitoring of positions for an appliance to satisfy some conditions, but in most cases the more intense monitoring may itself be triggered and terminated by other parameters.

Figure 4:
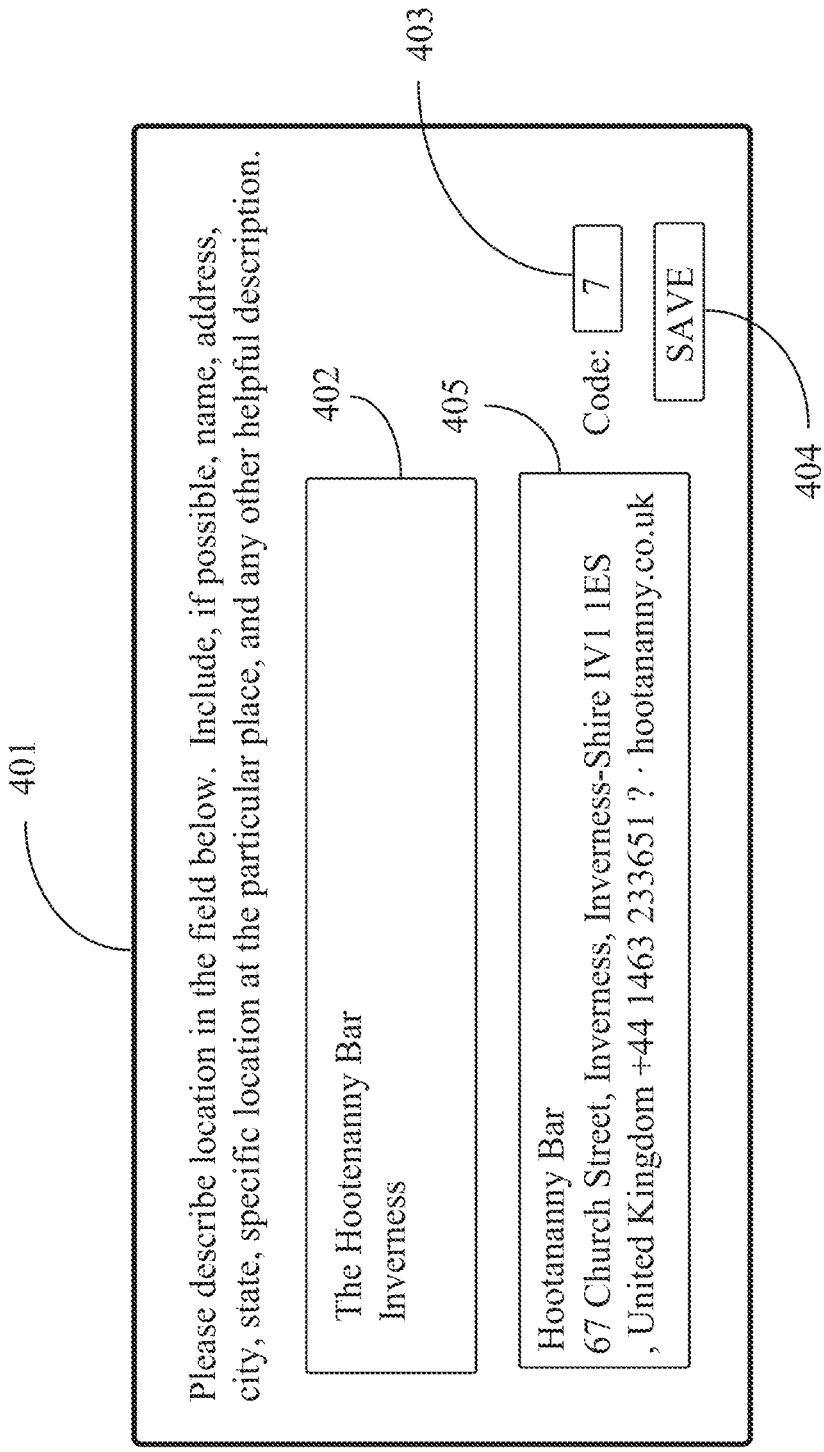
FIG. 4 is a diagram illustrating an interactive window aiding a user in configuring geo-location for callback.

In one implementation the contact center may build and maintain a database of locations described in a variety of ways, associated with specific geo-coordinates. FIG. 4 is an exemplary diagram illustrating operation in this implementation. For example, the contact center may cooperate with Hilton hotels to provide coordinates for lobbies of all Hilton hotels in France or Italy, or everywhere on the planet. Coordinates may be stored and accessible for hotel rooms in the hotels, pool areas, restaurants and bars. Other enterprises and organizations may cooperate as well, including government organizations, churches, and many, many more. From this, a rich database associating Lat/Long coordinates with specific locations may be generated.

With a sufficiently rich database the contact center can offer to guide the customer in setting locations for triggering callback in a broad variety of ways. For example, the customer may be queried for an address, a hotel name and a city, a restaurant name in Chicago, and other locations, and the contact center may provide the coordinates to cooperate with the callback system to trigger events. In the example interactive window shown in FIG. 4 the customer is instructed to enter a description he or she may be able to provide for a location. The system parses the entry dynamically for key words, addresses, and the like and uses the parsed information to consult the preprogrammed database, and dynamically update a rich description in window 405 from the database. When the customer is satisfied that the Hootenanny bar she described in window 402 is the one returned in window 405, she may enter a code (she will be informed if the code is already used), and use the save button to store that location as one of the locations she wants to use for triggering a callback.

Figure 5:
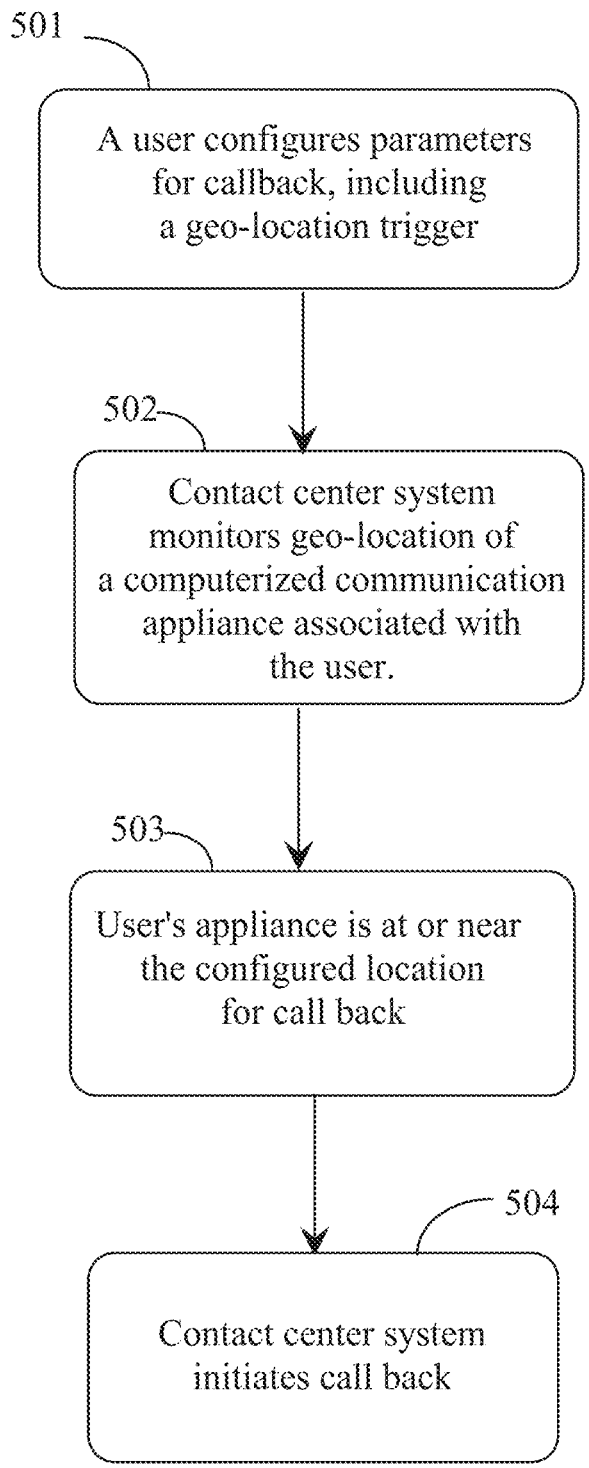
FIG. 5 is a flow diagram illustrating operation in one implementation of the present invention.

FIG. 5 is a flow diagram illustrating operation in one implementation of the present invention. The process may be described in terms of a software routine executed by the processor in the server 125 based on instructions stored in the server's memory. The instructions may also be stored in other non-transient computer readable media such as, for example, a CD-ROM, flash drive, or the like. A person of skill in the art should also recognize that the routine may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

In this example a user at step 501 has specified to a contact center at least one geo-location for triggering a callback, and may have also specified time and channel limitations or preferences. This may be done in any one of several ways. For example, a location trigger and other criteria may be set by a user in response to a query by an agent in a voice dialogue with the user, or in response prompts from an IVR, or the user may configure one or more time and callback trigger geo-locations via a website associated with the contact center handling calls on behalf of an enterprise. When this step is complete the call center has a callback scheduled to a particular user, and callback criteria, one of which is a trigger location that may be specified in latitude and longitude coordinates.

At step 502 the contact center monitors the geo-location of a computerized communication appliance, such as a smart phone, associated with the user, and designated by the user as the trigger device in implementations of the invention. In some implementations the user's appliance may be enabled for GPS, and the GPS location may be provided to the contact center by the network enterprise that provides GPS service to the user. This may be arranged with the user's permission with the network service provider. The user's location may also be provided by a cellular service provider based on cell tower triangulation techniques known in the art.

Typically a callback may be set for a day and time. In some implementations a callback may be a recurring event. For example, a user may want a call pertaining to some service every weekday at a particular time, and at a particular geo-location. In the situation where a day and time is known by the contact center system for a call, the location of the specified user appliance may not be monitored continually. According to this scenario, monitoring may begin, for example, at some pre-programmed time prior to the set time for the call. According to one embodiment, the arrival of the specified appliance at the geo-location may trigger the callback. According to one embodiment, if the time arrives, but the appliance is not seen to be at the trigger location, the call is not made.

In some implementations it may be that the user wants a call at a specified geo-location regardless of the time or day, or at any time the appliance is seen at that location during daylight hours, or in any of a variety of other circumstances. Monitoring the appliance location may then be accomplished according to specific requirements, so resources are not engaged unnecessarily.

At step 503 the user's appliance, presumably with the user attached, appears in the system's location service, or a notification comes from a third-party service, to be at or near the configured location for a callback. According to one embodiment, this is a trigger in the system's software to initiate the scheduled callback. At step 504 the contact center system initiates the callback. In some implementations the process may be a step-by-step process in which the call center system may use distance thresholds to trigger certain functions in the overall callback process.

In an implementation of the invention a communication system is provided, comprising a contact-center server having a processor, a data repository coupled to the server, and instructions executable by the processor from a non-transitory machine-readable medium, the instructions providing a communication process by scheduling a communication from the contact center to a user. According to one embodiment, a user is enabled to configure a geographic location for a computerized appliance. Location of the computerized appliance is periodically tracked by the contact center, and upon the geographic location of the computerized appliance being determined by the contact center to be the configured geographic location, a communication is initiated.

The invention is described in enabling detail in several aspects and implementations above through description of several drawing figures, and specific examples among many other possible implementations of the invention. The implementations described are meant to be exemplary, and there are other implementations that may be practiced wherein some details differ from the specific details in the described examples.

The communication that is triggered by location, even though it may be termed a callback in various implementations, need not necessarily be a voice call. The communication may be alternatively an email, an instant message, initiation of a chat session, or some other form of communication. In some implementations the user to receive such a communication may specify the channel, appliance, and other details concerning the communication.

According to one implementation, the user is enabled to configure one or more of date, time, and communication channel in addition to geographic location to initiate the scheduled communication. Also in one implementation the user is presented an interactive window enabling the user to indicate a point or region on a map to be used by the communication system as the geographic location to be used for triggering the communication. This may be done by the user constraining a box on the map, the boundaries of the box indicating the boundaries of the region. The point or region indicated by the user in the interactive window may be converted by the contact center into, for example, longitude and latitude coordinates and/or ranges of coordinates, and may be stored as the geographic location. In some cases the coordinates may be provided to the contact center by a third-party service.

In some implementations the contact center maintains a database relating locations by address and description to coordinates, the user is presented with a first interactive window for describing a location, and the contact center parses the user's input for keywords and phrases and presents candidate locations in a second window. In this case the database may be quite large, and may be developed by the contact center in cooperation with many enterprises, government organizations, and other sources.

In some implementations of the invention a user is enabled to opt out on a case-by-case basis. For example, since the contact center tracks the geo-location of the user's appliance, and a call is scheduled, the contact center may provide an additional service to the user by alerting the user to the fact that a call is scheduled to be triggered at a particular location, and this alert may be provided on the basis that the appliance has been tracked to be approaching the location, and is within a pre-programmed distance (or time) from the location.

In some implementations a user may be enabled to trigger a call from the user's appliance to the contact center based on the geo-location of the appliance. In one implementation a process may be initiated, based on the user's appliance approaching a specific geo-location, to place a virtual call from the user in a queue for a particular agent, or available agent in a particular group of agents. Upon the appliance reaching the location, the call may be connected from the user's appliance to the contact center. The user may still be in queue, or the user's virtual call may have reached the head of the queue, and may be by-passed for an agent until the appliance reaches the geo-location, after which the user is next-in-queue for connection.

In some implementations of the invention geo-location may be in part provided by WiFi connection of a user's appliance to a WiFi hot spot of a particular enterprise. In the circumstance described above, wherein a user desires to be notified of status of airline connections upon arrival at a VIP lounge of an airline, if the contact center providing location-triggered callback also provides customer service for the particular airline, connection to the WiFi may serve as the trigger for the call to the user's appliance. In some implementations the airline might provide to the contact center dynamically, ID of appliances connecting, and the contact center may filter for IDs for which callback has been scheduled.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

The invention claimed is:

1. An apparatus for location-based communication, comprising:
   a processor; and
   a memory, the memory storing instructions that when executed by the processor, cause the processor to:
      schedule a communication between a contact center and a communication device associated with a user;
      prompt the user to configure geographic data including a path and direction of movement for the communication device;
      prompt the user to indicate, via an interactive window, a line on a map implemented as the path and direction of movement to trigger the communication, wherein the line comprises a plurality of points;
      track positions of the communication device; and
      initiate the communication, by the contact center, in response to determining that the positions of the communication device are within the configured path and direction of movement.

2. The apparatus of claim 1 wherein the instructions further cause the processor to:
   prompt the user to further configure one or more of date, time, or communication channel for the scheduled communication.

3. The apparatus of claim 1 wherein the instructions further cause the processor to:
   utilize a third party service to determine the points.

4. The apparatus of claim 1 wherein the instructions further cause the processor to:
   maintain a database relating locations by address and description to coordinates;
   prompt the user to describe a location;
   parse the location described by the user for keywords and phrases; and present to the user candidate locations matching the description.

5. The apparatus of claim 1 wherein the instructions further cause the processor to:
track location of the communication device by Global Positioning System (GPS).

6. The apparatus of claim 5 wherein the instructions further cause the processor to:
cooperate with a third-party service to track location of the communication device.

7. The apparatus of claim 6 wherein the instructions further cause the processor to:
cooperate with a cellular service provider to track location of the communication device.

8. The apparatus of claim 1 wherein the instructions further cause the processor to:
impose a time delay before initiating the communication in response to the path and direction of movement of the communication device being determined to be the configured path and direction of movement.

9. The apparatus of claim 1, wherein the configured geographic data further includes a configured geographic location, and wherein the instructions further cause the processor to:
in response to a particular position of the tracked positions of the communication device being a particular distance from the configured geographic location, place a virtual call event on a queue associated with the contact center, wherein the virtual call event is a place holder for the user in the queue;
track progress of the virtual call event in the queue;
in response to determining that the virtual call event is next-in-line in the queue for establishing communication between the contact center resource and the communication device:
determine whether a location of the communication device is within the configured geographic location; and
in response to determining that the location is not within the configured geographic location, refrain from establishing communication between the contact center resource and the communication device and hold the virtual call in place in the queue while allowing another virtual call event to by-pass the virtual call event; and
in response to determining that the location is within the configured geographic location, establish the communication between the contact center resource and the communication device.

10. A method for location-based communication, the method comprising:
scheduling by a computing device having a processor, communication from a contact center to a communication device associated with a user;
presenting to the user an interactive window by the computing device for prompting the user to configure geographic data including a path and direction of movement associated with the communication device;
prompting the user to indicate, via an interactive window, a line on a map implemented by the computing device as the path and direction of movement implemented for triggering the communication, the line comprising a plurality of points;
periodically tracking by the computing device positions of the communication device; and
in response to determining that the positions of the communication device are within the configured path and direction of movement, initiating, by the contact center, the communication.

11. The method of claim 10 further comprising:
prompting the user to configure one or more of date, time, or communication channel in addition to geographic location to initiate the scheduled communication.

12. The method of claim 10 further comprising: providing the points to the contact center by a third-party service.

13. The method of claim 10 further comprising:
maintaining a database relating locations by address and description to coordinates;
presenting to user a first interactive window for describing a location;
parsing the user's description for keywords and phrases; and
presenting candidate locations in a second window.

14. The method of claim 10 further comprising:
tracking location of the communication device by Global Positioning System (GPS).

15. The method of claim 14 further comprising:
accomplishing GPS tracking by a third-party system; and
providing coordinates from the tracking to the computing device.

16. The method of claim 10 further comprising:
tracking the location of the communication device by a wireless enterprise; and
providing coordinates from the tracking to the contact center.

17. The method of claim 10 further comprising:
imposing a time delay prior to the communication being initiated.

* * * * *